C. L. BOTTUM.
CHURN.
No 37,730. Patented Feb. 24, 1863
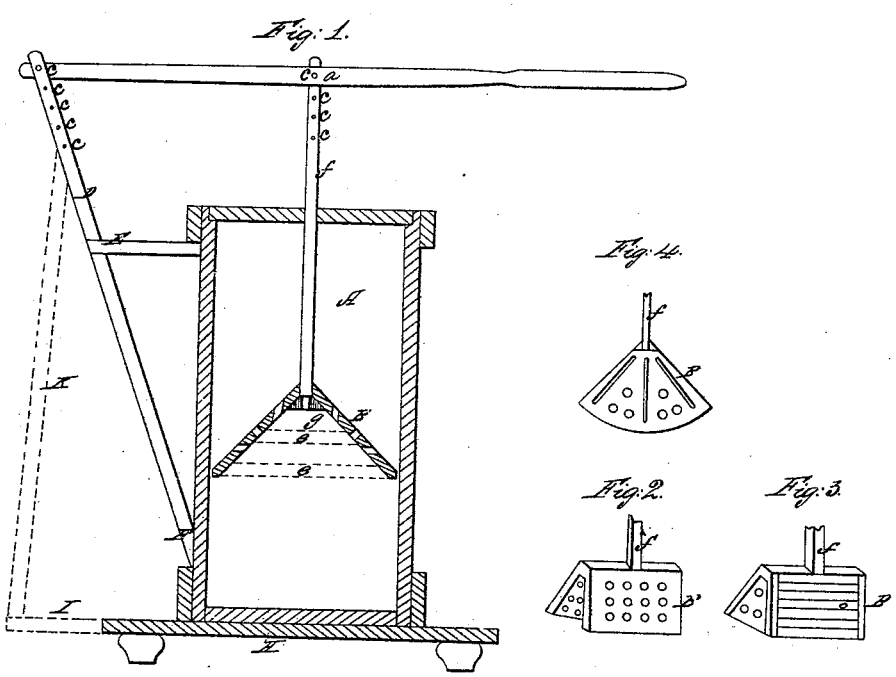
Witnesses:
J. C. Howells
John W. Ray
Inventor:
Charles L. Bottum

UNITED STATES PATENT OFFICE.

CHARLES L. BOTTUM, OF DANSVILLE, NEW YORK.

IMPROVEMENT IN CHURNS.

Specification forming part of Letters Patent No. 37,730, dated February 24, 1863.

*To all whom it may concern:*

Be it known that I, CHARLES L. BOTTUM, of Dansville, in the county of Livingston, in the State of New York, have invented a new and Improved Churn; and I hereby declare the following to be a full and exact description of the same, reference being had to the accompanying drawings, similar letters of reference indicating like parts in all the drawings.

Figure 1 is a sectional elevation of my improved churn. Figs. 2, 3, and 4 are intended to represent modifications of my improved churn-dasher.

The nature of my improvement or invention consists in providing a churn with a dasher of such form and construction that its use will shorten the process of churning and more thoroughly separate the butter from the milk or cream and collect it, thereby increasing the quantity and improving its quality, together with devices for regulating the movement of the dasher, as will be more fully hereinafter set forth.

To enable others skilled in the art to make and use my invention, I will proceed to describe its construction and operation.

A, Fig. 1, represents the body of the churn, and may be of any suitable shape and material.

D is the standard or fulcrum, provided with two or more holes, for securing the end of the lever C, thus regulating the motion of the dasher B, which is attached to the lever C at $a$ by the rod $f$. The standard or fulcrum D should be firmly secured to the churn at E and F. For power-churns, the platform H should be extended and the standard or fulcrum D braced, as seen in the dotted lines I and K in Fig. 1.

The dasher B, as seen in Fig. 1, is of an angular form, and may be made at any desirable angle, (but fixed or permanent so far as its action is concerned,) possessing two or more sides and composed of one or more pieces of any suitable material, with cross pieces or braces, as seen in the dotted lines $e\ e$, Fig. 1. The dasher B is secured to the rod $f$ at $g$ by any suitable device, and its sides are provided with perforations or openings at various angles with their surfaces and of any desirable shape, as may be seen in Figs. 1, 2, 3, and 4. The size of the dasher should be such as to fit loosely the cavity of the churn, and one-half-inch play on all sides of the dasher is not considered too much.

Figs. 2, 3, and 4 represent modifications of the dasher B, Fig. 4 being the frustum of a cone to be used in a round churn. The other modifications are useful accordingly as the milk or cream is increased or diminished in thickness or quantity.

Operation: The dasher B is attached to and operated on by the lever C at $a$, and the stroke of the dasher should be regulated to the quantity of milk or cream by securing the rod $f$ to the lever C, or the lever C to the standard or fulcrum D, by the holes $c\ c\ c\ c\ c$, as can be seen in Fig. 1. In the act of churning, the dasher should be raised to the surface of the cream, so that in its downward motion the milk or cream may be forced up the sides of the churn, and, coming over the upper surfaces or sides of the dasher, become freely and intimately mixed with the air contained within the dasher, and that is forced through the openings of the dasher by reason of its pressure on the surface of the milk or cream, thus aerating the entire mass, equalizing the temperature, and securing a uniform and simultaneous separation of the butter from the milk or cream, thereby enhancing the quantity and its quality, for in churns where the agitation, temperature, and aeration of the milk or cream are not uniform the butter will be found in all stages of "coming," as it is termed, in consequence of which a portion is churned too much, which injures its keeping qualities, while that rich oily substance that imparts color and flavor to the butter is worked off and incorporated with the buttermilk.

In gathering the butter, the upward motion of the dasher—drawing or sucking—and its downward motion—forcing the minute globules of butter to the center of the churn and dasher—secure its ready cohesion, and it becomes solid at once.

What I claim, and desire to secure by Letters Patent, is—

1. The use of the angular dasher B, as seen in Fig. 1, and its various modifications, as shown in Figs. 2 and 3, with or without the adjustable rod $f$, substantially as set forth, and for the purpose described.

2. The use of the angular dasher B, with its modifications, in combination with the rod $f$, the adjustable standard or fulcrum D, the lever C, and the churn A, substantially as described.

CHARLES L. BOTTUM.

Witnesses:
D. ROWLAND,
J. C. HOWELLS.